(12) United States Patent
Yaji et al.

(10) Patent No.: US 6,265,238 B1
(45) Date of Patent: Jul. 24, 2001

(54) ELECTROSTATIC CAPACITIVE SENSOR AND METHOD FOR MANUFACTURING THE SAME

(75) Inventors: Kaneo Yaji; Shinji Kobayashi, both of Sagamihara (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/500,010

(22) Filed: Feb. 8, 2000

Related U.S. Application Data

(62) Division of application No. 08/886,433, filed on Jul. 2, 1997, now Pat. No. 6,051,855.

(30) Foreign Application Priority Data

Jul. 3, 1996 (JP) .................................................. 8-173849

(51) Int. Cl.[7] .................................................. H01L 21/00
(52) U.S. Cl. .............................. 438/50; 257/254; 73/780
(58) Field of Search ................................ 438/50, 52, 53; 257/254, 417, 420, 418; 73/514, 780

(56) References Cited

U.S. PATENT DOCUMENTS

| | | | |
|---|---|---|---|
| 3,911,738 | * 10/1975 | Fischer ...................................... | 73/141 |
| 5,072,277 | 12/1991 | Sakakibara et al. ..................... | 357/42 |
| 5,250,836 | 10/1993 | Miura et al. ............................ | 257/506 |
| 5,576,250 | 11/1996 | Diem et al. ............................. | 437/228 |
| 5,597,956 | * 1/1997 | Ito et al. ............................... | 73/514.18 |
| 5,612,494 | * 3/1997 | Shibano ................................. | 73/514.32 |
| 5,627,317 | 5/1997 | Offenberg et al. ..................... | 73/514.32 |
| 5,880,921 | 3/1999 | Tham et al. ............................ | 361/233 |

FOREIGN PATENT DOCUMENTS

| | | |
|---|---|---|
| 4332057 | 3/1995 | (DE) . |
| 4419844 | 12/1995 | (DE) . |
| 591554 | 4/1994 | (EP) . |
| 605300 | 7/1994 | (EP) . |
| 671629 | 9/1995 | (EP) . |

\* cited by examiner

*Primary Examiner*—Matthew Smith
*Assistant Examiner*—Calvin Lee
(74) *Attorney, Agent, or Firm*—Ostrolenk, Faber, Gerb & Soffen, LLP

(57) ABSTRACT

A miniature electrostatic capacitive sensor in which electrical insulation is reliably established between a CV conversion circuit and a sensing unit. Also disclosed is a manufacturing method for the above type of capacitive sensor. The capacitive sensor is constructed of a sensing unit having a movable electrode and a stationary electrode, and a CV-conversion-circuit-forming portion having a CV conversion circuit. The movable electrode is constructed of a first support portion, a leaf spring connected to the first support portion, and a mass portion movably supported by the leaf spring. The stationary electrode is formed of a second support portion and a projecting portion connected to the second support portion. The CV-conversion-circuit forming portion and the first and second support portion are made thin. Accordingly, a shallow clearance is formed between the CV-conversion-circuit forming portion and each of the first support portion and the stationary electrode. An insulating substance can thus be positively deposited in the clearance, thereby forming an electrically insulating portion between the CV conversion circuit and the sensing unit.

2 Claims, 7 Drawing Sheets

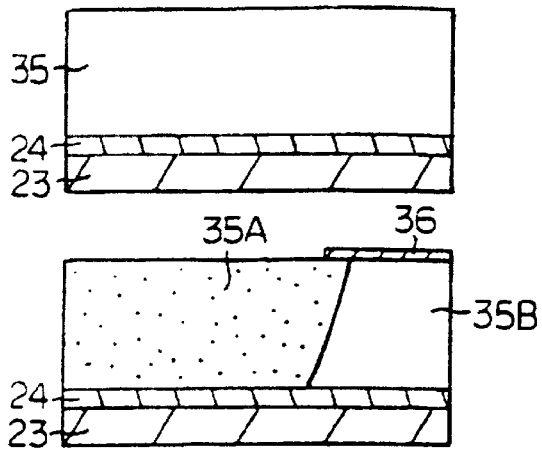
FIG. 3A
FIG. 3B
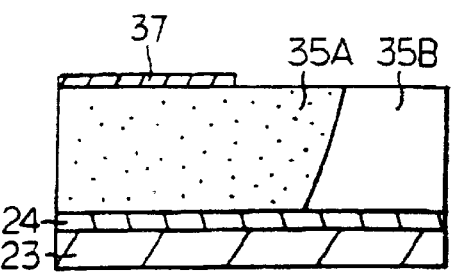
FIG. 3C
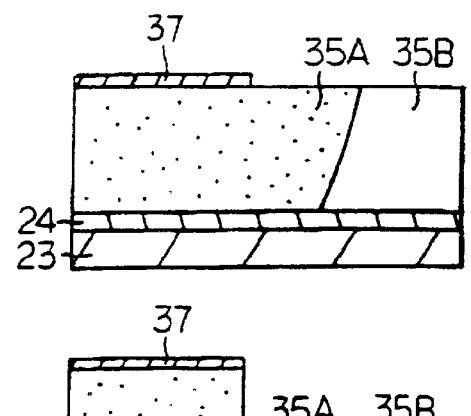
FIG. 3D
FIG. 3E
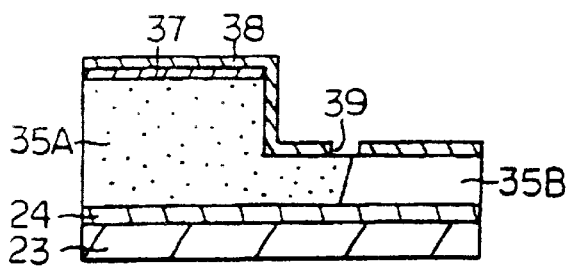
FIG. 3F
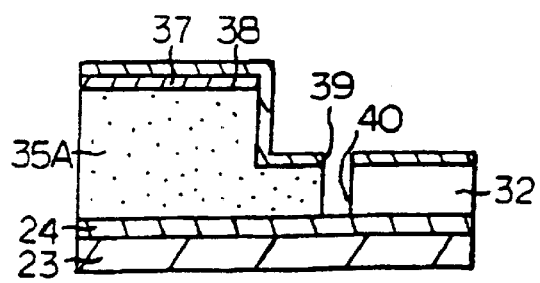

ated with reference to FIG. 5A. The capacitive sensor
ELECTROSTATIC CAPACITIVE SENSOR AND METHOD FOR MANUFACTURING THE SAME This is a division of application Ser. No. 08/886,433, filed Jul. 2, 1997, now U.S. Pat. No. 6,051,855 allowed.

BACKGROUND OF THE INVENTION

1. Field of the Invention

The present invention relates to an electrostatic capacitive sensor and a method for producing the same sensor.

2. Description of the Related Art

Progress is rapidly being made in silicon micromachining technology in which various types of miniature parts are produced by using a very-high-precision etching method for single-crystal silicon and a polysilicon-deposition method, such as chemical vapor deposition (CVD) or physical vapor deposition (PVD). As a consequence, various types of miniature parts, such as electrostatic capacitive sensors for detecting, for example, acceleration and angular velocity, have been developed.

The principle of the capacitive sensor will now be explained with reference to FIG. 5A. The capacitive sensor is constructed of a sensing unit 1 and a CV conversion circuit 2 for converting capacitance into voltage.

The sensing unit 1 is formed of a movable electrode 3 and a stationary electrode 4, both of which are flat-plate type and placed parallel to each other with their surfaces oppositely facing. When acceleration is applied perpendicular to the surface of the movable electrode 3, the electrode 3 is displaced in a direction indicated by the arrow D1 shown in FIG. 5A to change the distance L1 between the movable electrode 3 and the stationary electrode 4. Accordingly, the capacitance between the two electrodes 3 and 4 is changed in proportion to the reciprocal of the distance L1 therebetween. In contrast, upon application of acceleration parallel to the surface of the movable electrode 3, the electrode 3 is displaced in a direction indicated by the arrow D2 shown in FIG. 5A to vary the opposing area of the electrodes 3 and 4. Consequently, the capacitance between the electrodes 3 and 4 is changed in proportion to the opposing area.

As the CV conversion circuit 2, a capacitance detecting circuit using what is referred to as a "diode bridge" is generally employed. The input terminals of the conversion circuit 2 are electrically connected to the movable electrode 3 and the stationary electrode 4, respectively, via individual lead lines 5. As a consequence, a change in the capacitance between the electrodes 3 and 4 is converted into a voltage by the CV conversion circuit 2, thereby detecting the acceleration.

In the principle explained above, the sensing unit 1 has been provided by way of example only, and it is not restricted to the above-described type. For example, the sensing unit 1 may be formed, as illustrated in FIG. 5B, of a movable electrode 3 and a pair of stationary electrodes 4A and 4B. In this case, the electrodes 4A and 4B are disposed parallel to each other with their surfaces oppositely facing. Further, the movable electrode 3 is located parallel to and between the stationary electrodes 4A and 4B in such a manner that the top and bottom surfaces of the electrode 3 oppositely face the electrodes 4A and 4B. The input terminals of the CV conversion circuit 2 are electrically connected to the movable electrode 3 and the stationary electrodes 4A and 4B, respectively, via individual lead lines 5. Upon application of acceleration perpendicular to the surface of the movable electrode 3, the electrode 3 is displaced in a direction indicated by the arrow D1 shown in FIG. 5B to change the distance L2 between the movable electrode 3 and the stationary electrode 4A and the distance L3 between the electrodes 3 and 4B. Accordingly, changes in the capacitance between the movable electrode 3 and the stationary electrode 4A and the capacitance between the electrodes 3 and 4B are converted into a differential voltage by the CV conversion circuit 2, thereby detecting the acceleration. It should be noted that an explanation of the structure of the differential-voltage-type sensor will be omitted in a specific example of the capacitive sensor to be described below.

A typical known type of electrostatic capacitive sensor will now be explained more specifically with reference to FIGS. 6A and 6B.

The capacitive sensor is constructed of a support base 6, a sensing unit 7, and a CV conversion circuit 8. The support base 6 is formed in the shape of a quadrilateral plate and made of, for example, electrically insulating glass. A rectangular recessed portion (opening) 9 is formed substantially at the center of the surface of the support base 6, while another rectangular recessed portion (opening) 10 is provided in the vicinity of one edge of the base 6. The recessed portions 9 and 10 are disposed parallel to each other.

The sensing unit 7 is formed of a stationary electrode 11 and a movable electrode 12, both of which exhibit electrical conductivity. The sensing unit 7 is produced by using single-crystal silicon doped with impurity ions, such as phosphorus, boron, or antimony. The stationary electrode 11, being formed in the shape of a rectangular plate, is provided projecting from a longitudinal edge of the recessed portion 9 on the opposite side thereof, away from the other recessed portion 10 formed in the support base 6.

The movable electrode 12 is integrally constructed of a pair of support portions 13, a mass portion 14, and a pair of interconnecting portions 15 for connecting the mass portion 14 to the respective support portions 13.

The pair of support portions 13 are formed in the shape of a quadrangular prism and project from the respective end edges of the recessed portion 9. The support portions 13 are disposed with their major side faces oppositely facing each other. The height of the support portions 13 is the same as the stationary electrode 11.

The mass portion 14 is formed in the shape of a rectangular prism and is interposed between the opposing side faces of the support portions 13. The mass portion 14 is disposed parallel to the stationary electrode 11 with a predetermined spacing in such a manner that one longitudinal face of the mass portion 14 oppositely faces one longitudinal face of the stationary electrode 11. The height of the mass portion 14 is the same as the stationary electrode 11.

The interconnecting portions 15 are formed in the shape of a thin rectangular plate and each connect the end face of the mass portion 14 to the opposing face of the support portion 13. The interconnecting portion 15 is identical to the mass portion 14 in height and perpendicularly provided at the center of the end face of the mass portion 14. With this arrangement, the mass portion 14 is held by the interconnecting portions 15 in such a manner that it floats over the recessed portion 9. The interconnecting portions 15 are formed thin in a direction perpendicular to the longitudinal face of the mass portion 14 so that they can be easily deformed in a bending manner in the same direction. Thus, when acceleration is applied perpendicular to the longitudinal faces of the mass portion 14, the interconnecting portions 15 are deformed in a bending manner in the direction in which acceleration is applied, thereby changing the distance between the mass portion 14 and the stationary electrode 11.

The CV conversion circuit 8 is formed at the center of the bottom surface of a single-crystal-silicon block 16. The block 16 is located on the recessed portion 10 in such a manner that the peripheral edge on the bottom surface of the block 16 is disposed around the recessed portion 10. Accordingly, the CV conversion circuit 8 is held at the center of the recessed portion 10 without directly contacting the insulating substrate 6. The height of the block 16 is the same as the stationary electrode 11. The input terminals of the CV conversion circuit 8 are electrically connected to the stationary electrode 11 and the movable electrode 12, respectively, via individual lead lines 17 formed on the top surface of the support base 6 and the bottom surface of the block 16. With this construction, a change in capacitance between the mass portion 14 and the stationary electrode 11 can be converted into a voltage by the CV conversion circuit 8, thereby detecting the acceleration applied to the mass portion 14 of the movable electrode 12.

A brief explanation will now be given of a manufacturing method for the electrostatic capacitive sensor constructed as described above while referring to FIGS. 7A through 7E.

Silicon nitride (SiNx) film 19 is deposited, as illustrated in FIG. 7A, on the top and bottom surfaces of a single-crystal silicon substrate 18 by using the low-pressure CVD method. Further, the silicon nitride film 19 on the bottom surface of the substrate 18 is patterned into a predetermined shape using photolithographic technology and anisotropic etching technology, thereby forming etching masks 19A, 19B and 19C.

Subsequently, the single-crystal silicon substrate 18 is allowed to react with an alkaline aqueous solution, such as potassium hydroxide (KOH), so as to perform anisotropic-etching on the portions not covered by the etching masks 19A through 19C. As a result, a plurality of projecting portions 18A, 18B and 18C are formed, as shown in FIG. 7B. As will be described later, the projecting portions 18A, 18B and 18C correspond to the stationary electrode 11, and the mass portion 14 of the movable electrode 12, and the CV conversion circuit 8, respectively. It should be noted that the projecting portions 18A, 18B and 18C are integrally formed with the remaining silicon substrate 18 protected from etching.

The etching masks 19A through 19C are then removed, as shown in FIG. 7C, by means such as chemical etching using phosphoric acid or reactive ion etching (RIE). Thereafter, the projecting portions 18A and 18B are doped with impurity ions using techniques such as thermal diffusion or ion implantation, thereby making the projecting portions 18A and 18B electrically conductive. Moreover, the CV conversion circuit 8 is formed at the center of the forward end face of the projecting portion 18C according to a known semiconductor-integrated-circuit formation technique.

Then, the forward end faces of the projecting portions 18A, 18B and 18C are overlaid, as illustrated in FIG. 7D, on the surface of the support base 6 provided with the recessed portions 9 and 10 by means such as RIE. More specifically, the forward end face of the projecting portion 18A is placed at the edge of the recessed portion 9, while the forward end face of the projecting portion 18B is positioned at the center of the recessed portion 9. Further, the peripheral edge of the forward end face of the projecting portion 18C is disposed on the recessed portion 10 while contacting the edge of the portion 10. The forward end faces of the projecting portions 18A, 18B and 18C are then fixed on the support base 6 by means such as anode coupling or fusion coupling.

Subsequently, the remaining single-crystal silicon substrate 18 protected from etching is removed, as illustrated in FIG. 7E, using techniques such as RIE or polishing, thereby separating the projecting portions 18A, 18B and 18C. As a consequence, the stationary electrode 11, the movable electrode 12, and the block 16 are formed, thus completing an electrostatic capacitive sensor.

In the aforedescribed capacitive sensor, since the sensing unit 7 is formed by etching the single-crystal silicon substrate 18, the stationary electrode 11 and the mass portion 14 of the movable electrode 12 can be made large. This increases the opposing area of the stationary electrode 11 and the mass portion 14, thereby achieving a large capacitance therebetween.

However, in the above-described electrostatic capacitive sensor, since anode coupling or fusion coupling is performed to fix the substrate provided with the projections onto the support base, high voltages or high heat used during the substrate-mounting operation may produce an adverse influence on the CV conversion circuit. This may cause a breakdown of the circuit.

Moreover, a recessed portion is provided for the support base to keep the CV conversion circuit from directly contacting the support base in order to relax a distortional stress generated therebetween. However, a distortional stress produced between the peripheral edge of the block and the support base may sometimes adversely influence the CV conversion circuit, causing the circuit to break. To overcome this drawback, one of the measures to be taken may be to form a CV conversion circuit on the top surface of the block which is less vulnerable to a distortional stress. However, this measure requires the provision of lead lines on the lateral surfaces as well as on the top surface of the block to electrically connect the CV conversion circuit with the stationary electrode and the movable electrode, which makes the provision of the lead lines difficult. Additionally, if the stationary electrode and the CV conversion circuit are integrally formed, the area of contact between these elements and the support base is unfavorably increased to generate a larger distortional stress, which adversely affects the CV conversion circuit more severely. Accordingly, the stationary electrode and the CV conversion circuit are required to be separately formed, thereby making the manufacturing process complicated and also enlarging the resulting sensor.

SUMMARY OF THE INVENTION

Accordingly, the present invention improves upon the above-described prior art by providing an electrostatic capacitive sensor free from the abovedescribed problems, and a manufacturing method for the same sensor.

In order to obtain such improvements, according to one aspect of the present invention, there is provided an electrostatic capacitive sensor comprising: a support base having an electrically insulating surface; a sensing unit formed of a movable electrode and a stationary electrode, both of which are provided on the support base, the movable electrode including a first support portion fixed onto the support base, a leaf spring held by the first support portion in such a manner that the spring floats over the surface of the support base, and a mass portion movably supported by the leaf spring, the stationary electrode including a projecting portion fixed onto the support base and opposedly facing the mass portion; and a CV-conversion-circuit forming portion having a CV conversion circuit for converting a change in capacitance of the sensing unit into a voltage, an insulating portion being formed between the CV-conversion-circuit forming portion and each of the first support portion and the stationary electrode.

With this arrangement, upon application of a force to the mass portion of the movable electrode in a direction along the longitudinal surface of the support base, the distance between the mass portion and the projecting portion of the stationary electrode is changed to vary the capacitance between the movable electrode and the stationary electrode. This change in capacitance is converted into a voltage signal by the CV conversion circuit formed in the CV-conversion-circuit forming portion. Further, the CV-conversion-circuit forming portion is made by processing the same substance as the movable electrode and the stationary electrode, for example, a single-crystal silicon layer. An insulating portion is, however, provided between the CV-conversion-circuit forming portion and each of the movable electrode and the stationary electrode to establish electrical insulation therebetween, thereby protecting a voltage signal output from the CV conversion circuit from entering the respective electrodes via the substance.

According to another aspect of the present invention, there is provided a manufacturing method for an electrostatic capacitive sensor, comprising the steps of: forming an electrically conductive region in part of a semiconductor single-crystal silicon layer which forms a silicon-on-insulator substrate; decreasing the thickness of a semiconductive region of the single-crystal silicon layer and the thickness of part of the electrically conductive region located adjacent to the semiconductive region; separating the semiconductive region and the electrically conductive region of the single-crystal silicon layer by forming a clearance at or in the vicinity of the interface therebetween; forming an insulating portion inside the clearance; forming a CV conversion circuit in the semiconductive region; electrically connecting an input terminal of the CV conversion circuit to the electrically conductive region via a lead line; and forming a sensing unit in the electrically conductive region.

In the above method, part of the electrically conductive region and the overall semiconductive region formed in the single-crystal silicon layer which forms an silicon-on-insulator substrate are formed thinner. This makes it possible to readily form a clearance at or in the vicinity of the interface between the electrically conductive region and the semiconductive region, thereby easily separating the two regions. The clearance is formed shallow to positively provide an insulating portion therein, thereby establishing electrical insulation between the conductive region and the semiconductive region. Further, the sensing unit and the CV conversion circuit can be produced by using the same single-crystal silicon layer, thereby simplifying the manufacturing process.

According to a further aspect of the present invention, there is provided a manufacturing method for an electrostatic capacitive sensor, comprising the steps of: forming an electrically conductive region in part of a semiconductor single-crystal silicon layer which forms a silicon-on-insulator substrate; decreasing the thickness of a semiconductive region of the single-crystal silicon layer and the thickness of part of the electrically conductive region located adjacent to the semiconductive region; forming an insulating portion by diffusing oxygen into the interface and its adjacent area between the semiconductive region and the electrically conductive region; forming a CV conversion circuit in the semiconductive region; electrically connecting an input terminal of the CV conversion circuit to the electrically conductive region via a lead line; and forming a sensing unit in the electrically conductive region.

In the above method, part of the electrically conductive region and the overall semiconductive region formed in the single-crystal silicon layer are made thinner. Accordingly, oxygen can be easily diffused into the interface or the adjoining area between the electrically conductive region and the semiconductive region, thereby establishing electrical insulation therebetween. Additionally, the sensing unit and the CV conversion circuit can be formed using the same single-crystal silicon layer, thereby enhancing the simplicity of the manufacturing process.

BRIEF DESCRIPTION OF THE DRAWINGS

FIGS. 3A to 3K schematically illustrate the process steps of a first manufacturing method for an electrostatic capacitive sensor according to an embodiment of the present method invention;

DESCRIPTION OF AN EMBODIMENT OF THE INVENTION

Figure 1:
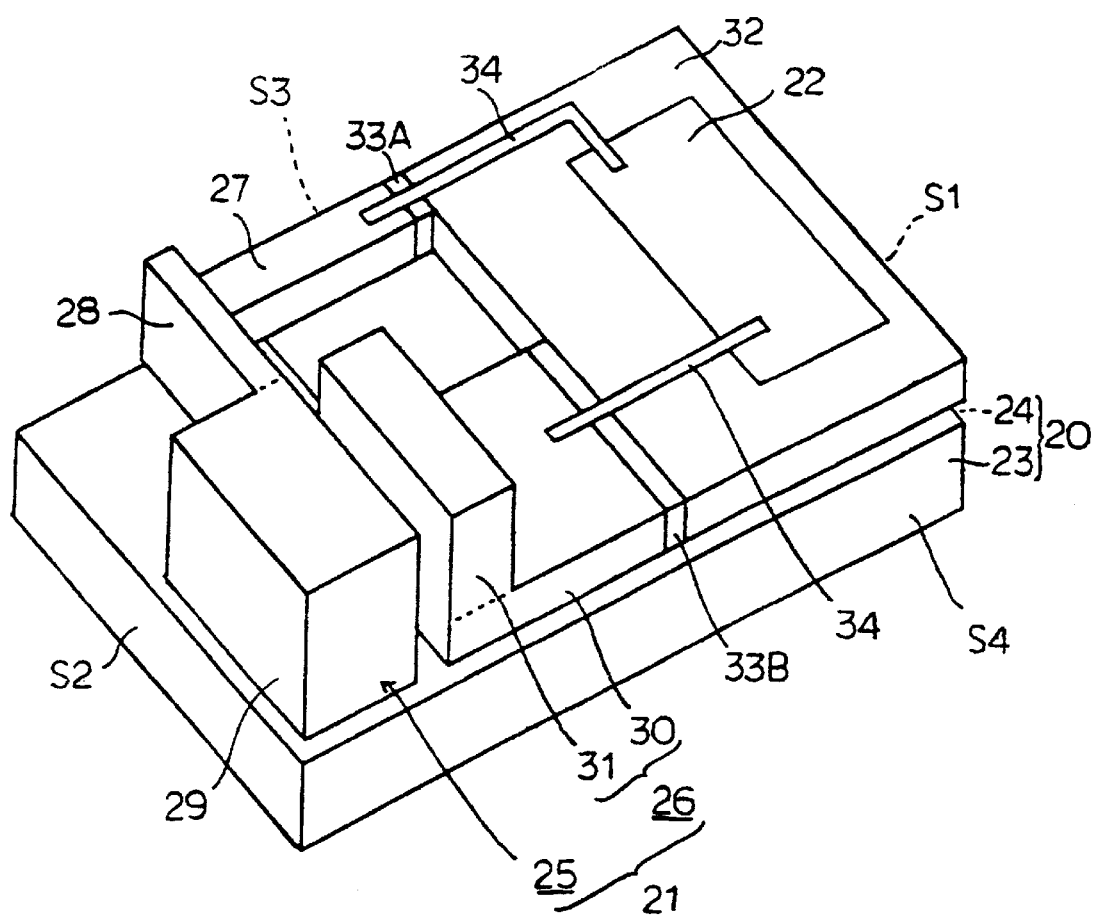
FIG. 1 is an external perspective view of an electrostatic capacitive sensor according to an embodiment of the present product invention.
Figure 2A:
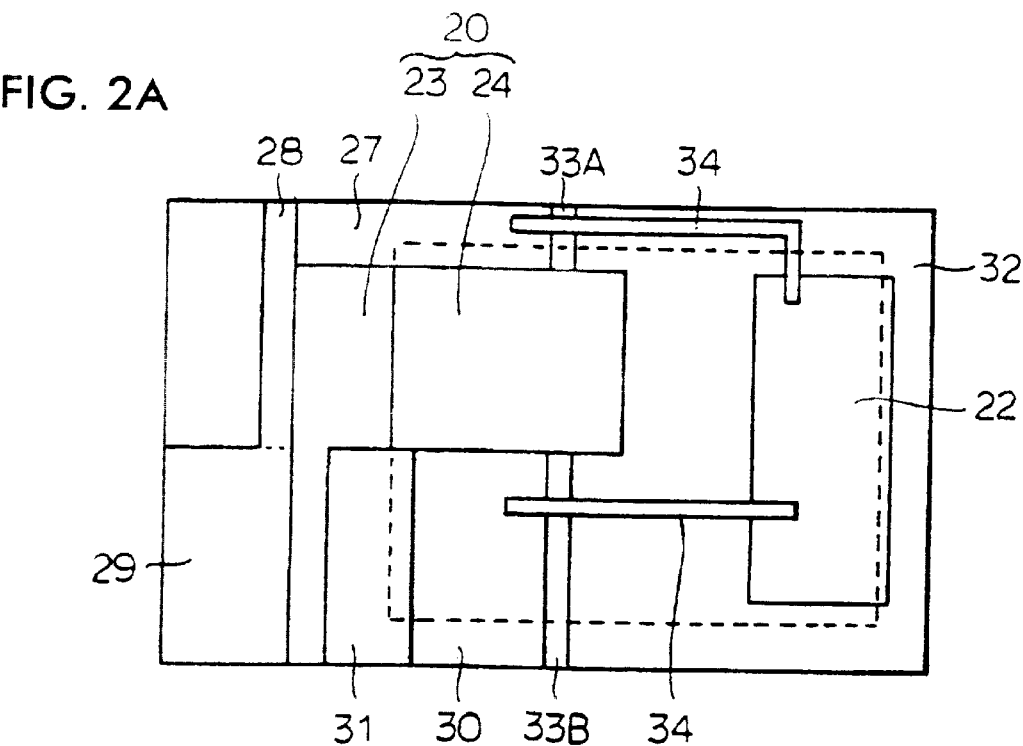
FIG. 2A is a top view of the capacitive sensor shown in FIG. 1.
Figure 2B:
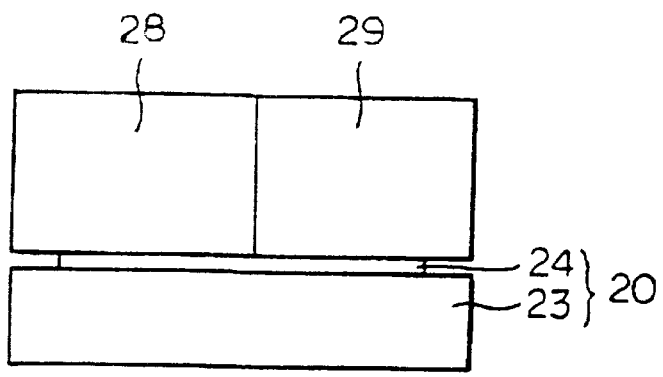
FIG. 2B is a side view illustrating the movable electrode of the capacitive sensor shown in FIG. 1.

An electrostatic capacitive sensor constructed in accordance with the present invention will now be described with reference to FIGS. 1 and 2.

The capacitive sensor is constructed of a support base 20, a sensing unit 21, and a CV conversion circuit 22.

The support base 20 is formed of a substrate 23 and a silicon oxide film 24. The substrate 23 is formed in a quadrilateral shape and made using single-crystal silicon. One of the opposing end faces of the substrate 23 is indicated by S1, while the other end face is designated by S2. One of the opposing longitudinal faces located parallel to a line connecting the above end faces S1 and S2 is represented by S3, while the other longitudinal face is depicted by S4. The overall top surface of the substrate 23, except for a fixed width in the vicinity of the end face S2, is substantially covered with the silicon oxide film 24. The silicon oxide film 24 possesses electrically insulating properties.

The sensing unit 21 has a movable electrode 25 and a stationary electrode 26. The sensing unit 21 is formed of electrically conductive single-crystal silicon doped with impurity ions, such as phosphorus, boron, or antimony. The movable electrode 25 is integrally formed of a first support portion 27, a leaf spring 28, and a mass portion 29. The mass portion 29 is movably held by the leaf spring 28 which is supported by the first support portion 27.

The first support portion 27 is formed in the shape of a rectangular plate and placed on the top surface of the substrate 23 with the silicon oxide film 24 therebetween substantially at the center along the longitudinal face S3. The forward end of the first support portion 27 near the end face S2 of the substrate 23 is held while floating above a portion of the surface of the substrate 23 not covered by the silicon oxide film 24.

The leaf spring 28 is formed in the shape of a thin quadrilateral plate and is coupled to the forward end of the first support portion 27. The forward end of the first support portion 27 floating above the surface of the substrate 23 is bonded perpendicular to the side face of the leaf spring 28 and its lower portion. With this arrangement, the leaf spring 28 is held while floating above the surface of the substrate 23. Since the leaf spring 28 is formed thin in the direction between the end faces S1 and S2 of the substrate 23, the spring 28 can be freely deformed in a bending manner in the same direction.

The mass portion 29 is formed in the shape of a rectangular prism and connected to an end face of the leaf spring 28. The mass portion 29 and the leaf spring 28 are formed with the same height and located with their top surfaces in the same plane. Accordingly, the mass portion 29 is held by the spring 28 while floating over the surface of the substrate 23 not covered by the silicon oxide film 24. A spacing equivalent to the thickness of the silicon oxide film 24 is provided between the bottom surface of the mass portion 29 and the top surface of the substrate 23.

The stationary electrode 26 is formed of a second support portion 30 and a projecting portion 31.

The second support portion 30 is formed in the shape of a rectangular plate and located on the top surface of the substrate 23 with the silicon oxide film 24 therebetween substantially at the center along the longitudinal face S4. The edge section of the second support portion 30 in the vicinity of the end face S2 of the substrate 23 is held over the surface of the substrate 23 not covered by the silicon oxide film 24. The second support portion 30 is formed to the same thickness as the first support portion 27.

The projecting portion 31 is provided at the edge section of the second support portion 30 closer to the end face S2 of the substrate 23. The projecting portion 31 is placed parallel to the mass portion 29 with their lateral surfaces opposedly facing each other with a fixed spacing. The opposing faces of the projecting portion 31 and the mass portion 29 are substantially identical in height and area.

In the sensing unit 21 constructed as described above, upon applying acceleration to the mass portion 29 in a direction along the longitudinal faces S3 and S4 of the substrate 23, the leaf spring 28 is deformed in a bending manner in the same direction to change the spacing between the mass portion 29 and the projecting portion 31, thereby accordingly varying the capacitance therebetween.

A CV-conversion-circuit forming portion 32 is provided on the support base 20 close to the end face S1 of the substrate 23. The conversion-circuit forming portion 32 is made of single-crystal silicon and formed with the same thickness as the first support portion 27. An insulating portion 33A is interposed between the first support portion 27 and the conversion-circuit forming portion 32, while another insulating portion 33B is disposed between the second support portion 30 and the forming portion 32, thereby establishing electrical insulation between each of the first and second support portions 27 and 30 and the conversion-circuit forming portion 32. The insulating portions 33A and 33B are formed identical to the first support portion 27 in thickness and are made of silicon oxide, polysilicon, or non-doped silicate glass (NSG). Formed in the CV-conversion-circuit forming portion 32 is the CV conversion circuit 22. One input terminal of the CV conversion circuit 22 is electrically connected to the movable electrode 25 via a lead line 34 provided on the surfaces of the first support portion 27, the insulating portion 33A, and the CV conversion-circuit forming portion 32. An electrical connection is also established between the other input terminal of the conversion circuit 22 and the stationary electrode 26 via a lead line 34 provided on the surfaces of the second support portion 30, the insulating portion 33B, and the conversion-circuit forming portion 32. The lead lines 34 are made of a thin film made of a substance, such as aluminum or gold.

An explanation will now be given of a first manufacturing method for the aforedescribed electrostatic capacitive sensor while referring to FIGS. 3A through 3K.

A silicon-on-insulator (SOI) substrate is formed, as shown in FIG. 3A, by depositing a single-crystal silicon layer 35 on the surface of the single-crystal silicon substrate 23 across the silicon oxide layer 24. As will be described later, the sensing unit 21 is formed using the silicon layer 35. The thickness of the silicon layer 35 is determined in consideration of the capacitance between the mass portion 29 and the projecting portion 31, such as those shown in FIG. 1. Generally, a silicon layer 35 having a thickness of several $\mu$m to several dozens of $\mu$m is used. Alternatively, SOI substrates which are now commercially available may be employed.

Subsequently, by using a silicon oxide film, a first mask pattern 36 is deposited at one end of the surface of the silicon layer 35. The silicon layer 35 is then doped with impurity ions from the exposed surface not covered by the first mask pattern 36. Accordingly, the silicon layer 35 is integrally formed, as illustrated in FIG. 3B, by an electrically conductive region 35A doped with impurity ions and a semiconductive region 35B not doped with impurity ions. It should be noted that the silicon layer 35 is doped with-impurity ions by means such as thermal diffusion or ion implantation.

After the first mask pattern 36 is removed by etching, a second mask pattern 37 is formed, as shown in FIG. 3C, on the surface of the other end of the silicon layer 35 opposite to the end where the first mask pattern 36 was formed. As a result, the central portion of the surface of the electrically conductive region 35A and the surface of the semiconductive region 35B are exposed. The second mask pattern 37 is formed of silicon oxide film, silicon nitride film, or photo resist film.

Thereafter, the surface of the silicon layer 35 not covered by the second mask pattern 37 is removed by etching, thereby making the layer 35 thinner, as illustrated in FIG. 3D. Etching is performed by means such as RIE or chemical etching using an alkaline aqueous solution, for example, potassium hydroxide.

A third mask pattern 38 is then deposited, as shown in FIG. 3E, on the surface of the second mask pattern 37, and the surfaces of the electrically conductive region 35A and the semiconductive region 35B, both of which have been exposed by etching in the previous step. The third mask pattern 38 is formed of a photo resist film. A slit 39 is provided in the third mask pattern 38 to expose the interface or its adjacent area between the conductive region 35A and the semiconductive region 35B.

The conductive region 35A and the semiconductive region 35B are partially eliminated by etching via the slit 39 to form a clearance 40 where the silicon oxide layer 24 is exposed. Thus, the semiconductive region 35B is separated from the conductive region 35A, as shown in FIG. 3F, to form the CV-conversion-circuit forming portion 32. It should be noted that etching is conducted by means such as RIE.

Figure 3G:
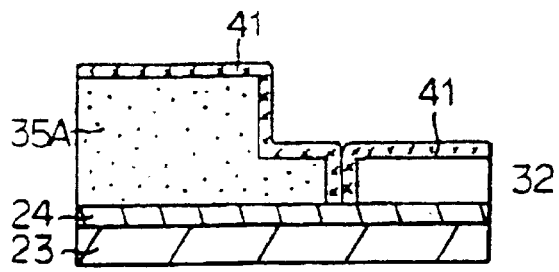

Subsequently, the second and third mask patterns 37 and 38 are removed by means such as RIE or chemical etching using, for example, a mixed solution of sulfuric acid ($H_2SO_4$) and hydrogen peroxide ($H_2O_2$). Then, an insulating film 41 made of an insulating substance, such as polysilicon or NSG, is deposited, as illustrated in FIG. 3G, on the surfaces of the conductive region 35A and the CV-conversion-circuit forming portion 32 and on the side walls of the clearance 40 according to a deposition method, such as CVD.

Figure 3H:
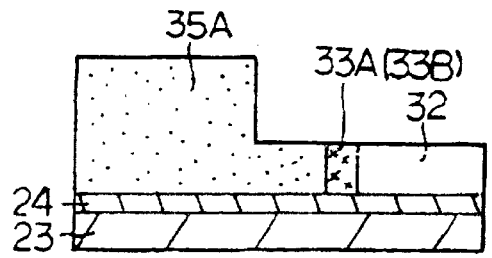

The insulating film 41 deposited on the surfaces of the conductive region 35A and the CV-conversion-circuit forming portion 32 is then eliminated by etching, such as RIE. The insulating film 41 formed on the clearance 40 is also removed by etching, such as RIE. Accordingly, the surfaces of the conductive region 35A and the CV-conversion-circuit forming portion 32 are exposed, and the insulating portions 33A and 33B are formed, as shown in FIG. 3H. As a consequence, the electrically conductive region 35A and the CV-conversion-circuit forming portion 32 are electrically insulated by the insulating portions 33A and 33B. The surfaces of the insulating portions 33A and 33B are located in substantially the same plane as the surfaces of the conductive region 35A and the conversion-circuit forming portion 32.

Figure 3I:
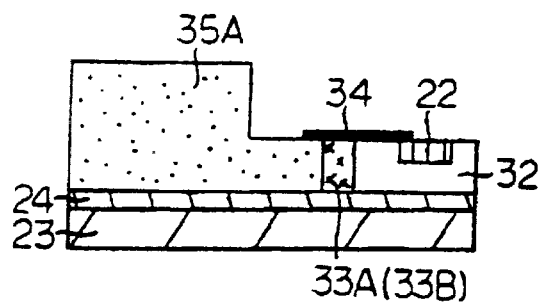

The CV conversion circuit 22 is then formed, as shown in FIG. 3I, in the CV-conversion-circuit forming portion 32 according to a known semiconductor-integrated-circuit formation technique. Thereafter, the input terminals of the conversion circuit 22 are electrically connected to the conductive region 35 via the lead lines 34 provided on the surfaces of the CV-conversion-circuit forming portion 32, the insulating portions 33A and 33B, and the conductive region 35A. The lead lines 34 are formed by means such as sputtering or vapor-deposition.

Figure 3J:
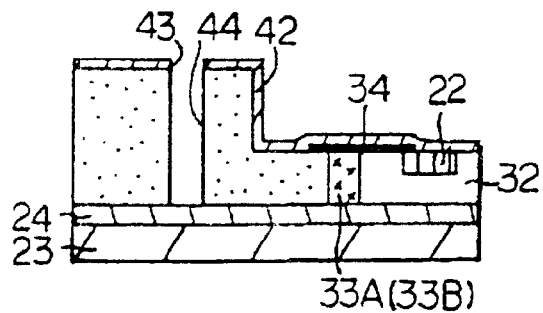
Figure 3K:
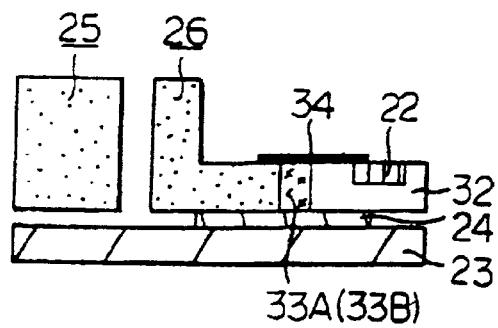

A fourth mask pattern 42 is deposited, as illustrated in FIG. 3J, to cover the surfaces of the conductive region 35A, the CV-conversion-circuit forming portion 32, and the lead lines 34. A slit 43 is provided in the fourth mask pattern 42 to partially expose the thick conductive region 35A. The fourth mask pattern 42 is formed of a photo resist film. Subsequently, the electrically conductive region 35A is eliminated, as shown in FIG. 3J, by etching via the slit 43 to form a clearance 44 where the silicon oxide layer 24 is exposed. As a result, the electrically conductive region 35A is divided, as illustrated in FIG. 3K, into two portions corresponding to the movable electrode 25 and the stationary electrode 26. It should be noted that etching is carried out by means such as RIE or chemical etching using an alkaline aqueous solution, for example, potassium hydroxide.

The silicon oxide layer 24 between the substrate 23 and part of the movable electrode 25 corresponding to the leaf spring 28 and the mass portion 29 is then eliminated by etching via the clearance 44, such as by chemical etching using an aqueous solution, for example, diluted hydrofluoric acid (HF). The silicon oxide layer 24 between the movable electrode 25 and the substrate 23 is removed by etching as described above, so that the movable electrode 25 floats above the substrate 23. To efficiently remove the silicon oxide layer 24 between the movable electrode 25 and the substrate 23, etching is generally carried out on the exposed lateral surfaces of the layer 24, as well as by removing the top surface of the layer 24 via the clearance 44. As a result, the silicon oxide layer 24 on the peripheral edge of the substrate 23 is removed, as illustrated in FIGS. 1, 2 and 3K. Thereafter, the fourth mask pattern 42 is eliminated by etching to complete an electrostatic capacitive sensor.

A second manufacturing method for the capacitive sensor will now be explained with reference to FIGS. 4A and 4B. An explanation of the same process steps as those of the above-described first manufacturing method will be omitted, and the same elements as those shown in FIG. 3 are designated by like reference numerals. Since the second method has a heating process step in an oxidizing atmosphere, as will be described while referring to FIG. 4, the third mask pattern 37 is formed of silicon nitride.

By the use of the process steps shown in FIGS. 3A through 3D, the single-crystal silicon layer 35 of the SOI substrate is divided into the electrically conductive region 35A and the semiconductive region 35B. Further, etching is performed so that part of the conductive region 35A and the overall semiconductive region 35B are made thin.

Figure 4A:
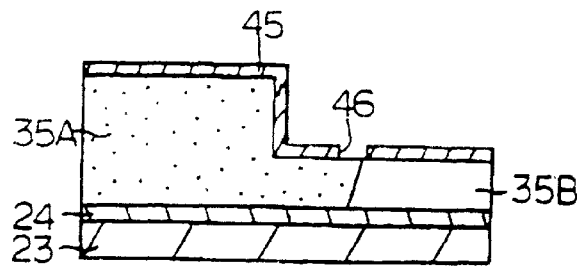
FIGS. 4A and 4B partially illustrate the process steps of a second manufacturing method for an electrostatic capacitive sensor according to another embodiment of the present method invention.
Figure 4B:
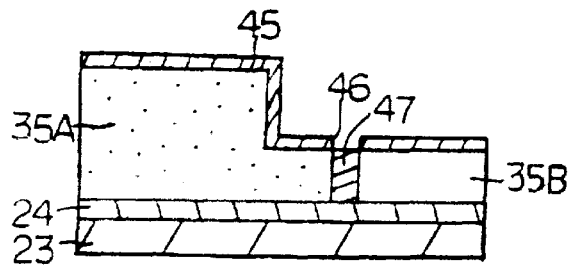
Figure 5A:
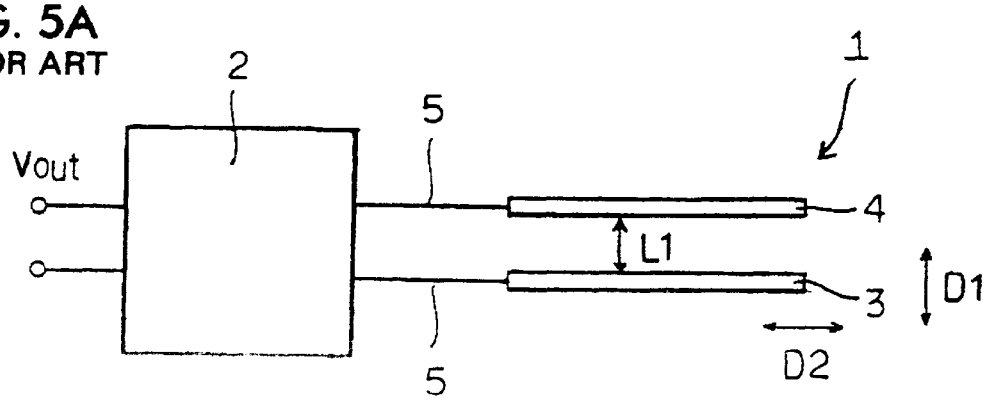
FIGS. 5A and 5B illustrate the principle of an electrostatic capacitive sensor.
Figure 5B:
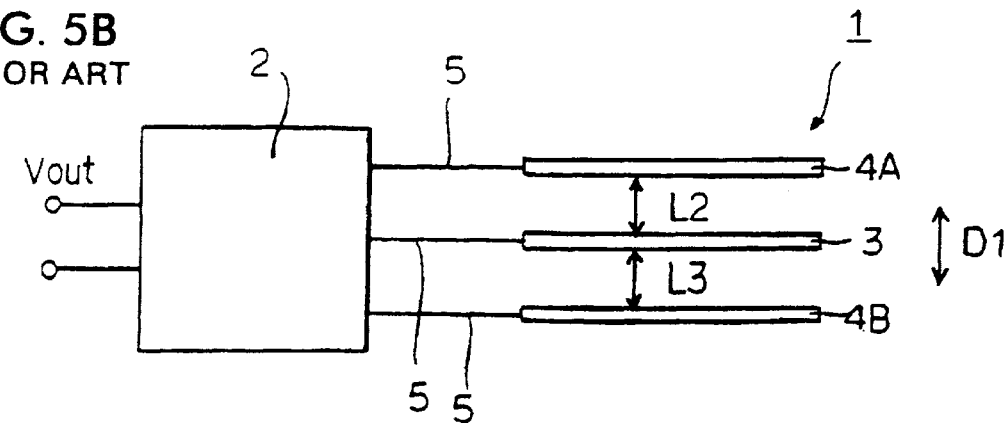
Figure 6A:
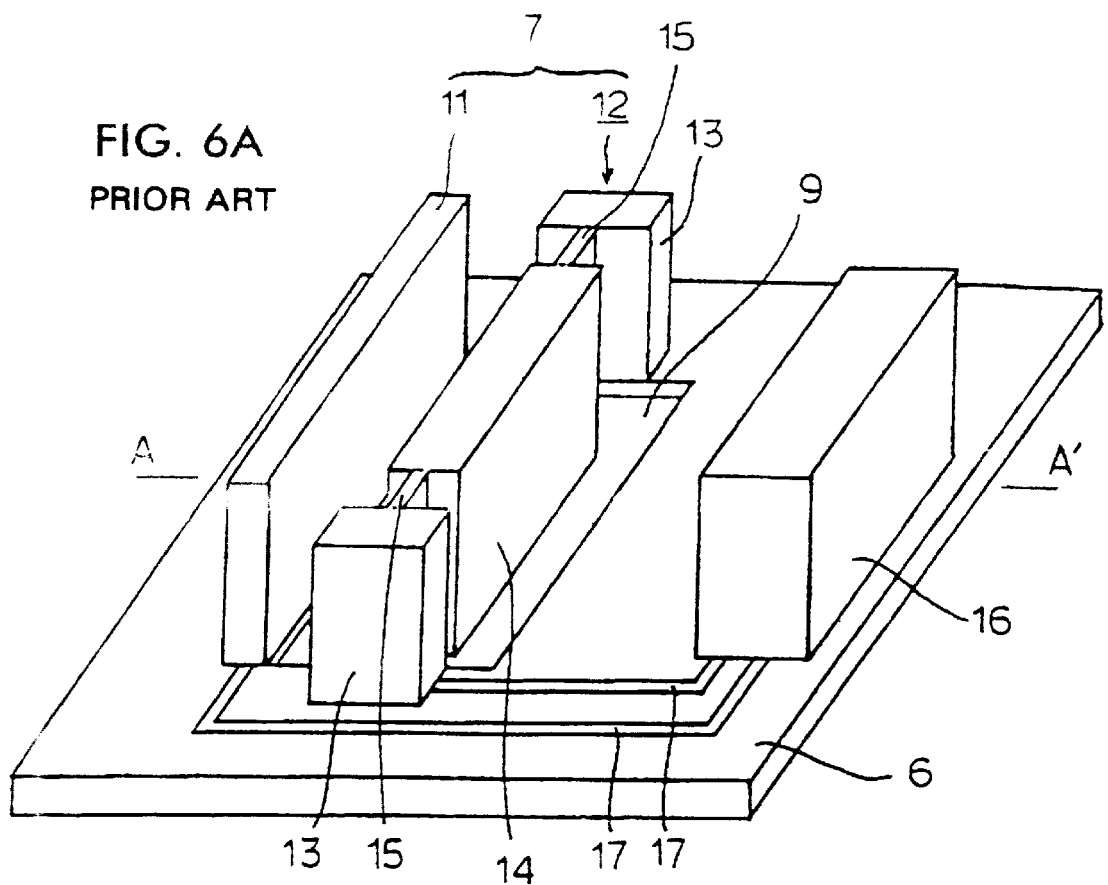
FIG. 6A is an external perspective view of a conventional electrostatic capacitive sensor.
Figure 6B:
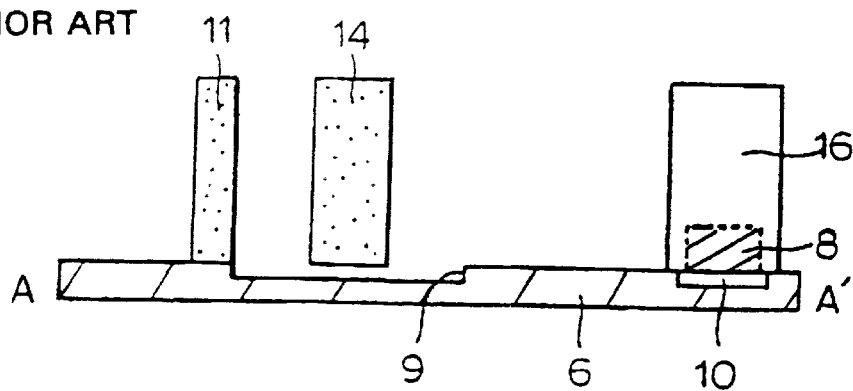
FIG. 6B is a cross-sectional view taken along line A–A' of FIG. 6A.
Figure 7A:
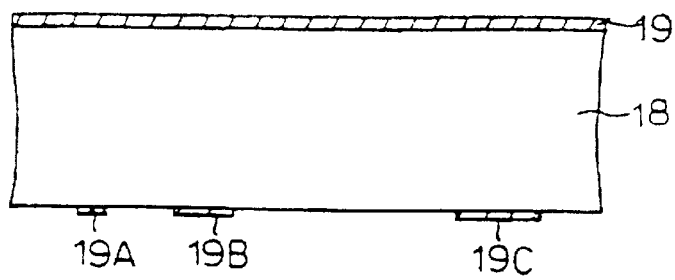
FIGS. 7A to 7E schematically illustrate the process steps of a known manufacturing method for an electrostatic capacitive sensor.
Figure 7B:
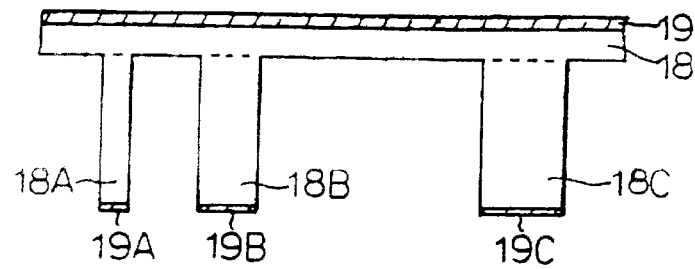
Figure 7C:
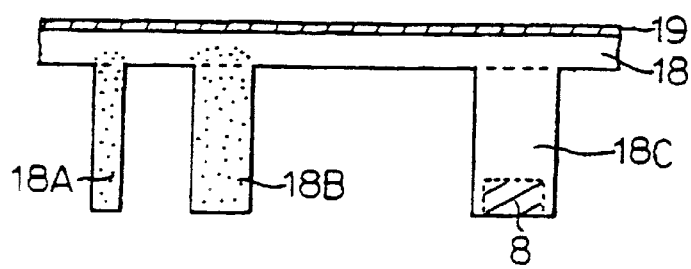
Figure 7D:
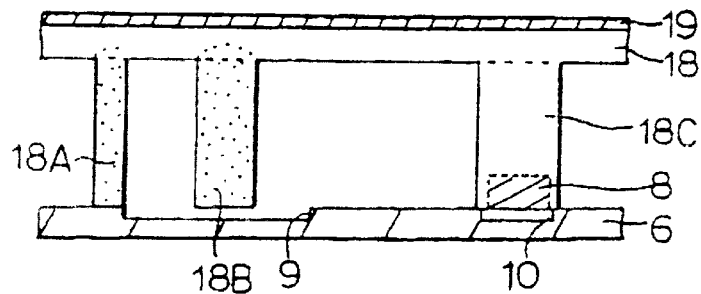
Figure 7E:
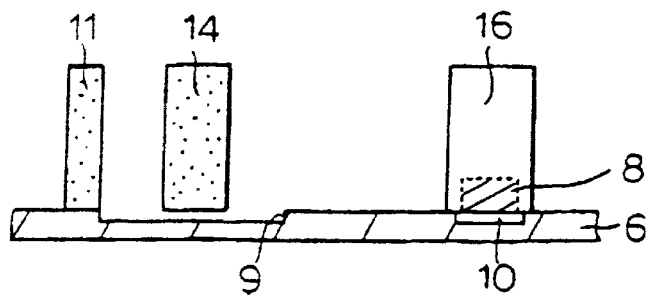

A fifth mask pattern 45 is then deposited, as illustrated in FIG. 4A, on the surfaces of the electrically conductive region 35A and the semiconductive region 35B. The fifth mask pattern 45, as well as the third mask pattern 37, is made of silicon nitride. A slit 46 is provided for the fifth mask pattern 45 to expose the interface or its adjacent area between the conductive region 35A and the semiconductive region 35.

Subsequently, the substrate is heated in an oxidizing atmosphere to diffuse oxygen into the single-crystal silicon layer 35 via the slit 46, thereby oxidizing the interface or its adjoining area between the conductive region 35A and the semiconductive region 35B. Accordingly, an insulating portion 47 is formed, as illustrated in FIG. 4B, thereby establishing electrical insulation between the conductive region 35A and the semiconductive region 35B.

The fifth mask pattern 45 is then removed by etching, such as RIE, and the process steps shown in FIGS. 3I through 3K are further conducted to complete an electrostatic capacitive sensor.

As is seen from the foregoing description, the present invention offers the following advantages.

According to the electrostatic capacitive sensor constructed in accordance with the present invention, a stationary electrode and a movable electrode are formed by etching a single-crystal silicon layer, thereby achieving a large opposing area of the faces of the two electrodes. Consequently, the capacitance between the stationary electrode and the movable electrode is increased, thereby significantly enhancing measurement precision of the resulting sensor. Further, by virtue of the insulating portions provided for the single-crystal silicon layer, reliable electrical insulation can be established between the CV conversion circuit and the sensing unit. It is thus possible to form the CV conversion circuit and the sensing unit by using the same single-crystal silicon layer, thereby downsizing the resulting sensor. Additionally, this sensor is free from the generation of distortional stress, thereby improving the reliability of the CV conversion circuit.

According to the manufacturing method for the electrostatic capacitive sensor of the present invention, the CV-conversion-circuit forming portion and the sensing unit can be integrally produced by using the same single-crystal silicon layer, thereby simplifying the manufacturing process. Moreover, thanks to the insulating portions provided for the single-crystal silicon layer which is made thin by etching, electrical insulation can be positively established between the CV-conversion-circuit forming portion and the sensing unit. As a consequence, the electrical reliability of the capacitive sensor is improved.

What is claimed is:

1. A manufacturing method for an electrostatic capacitive sensor, comprising the steps of:

forming an electrically conductive region in part of a semiconductor single-crystal silicon layer which forms a silicon-on-insulator substrate;

decreasing the thickness of a semiconductive region of said single-crystal silicon layer and the thickness of part of said electrically conductive region located adjacent to said semiconductive region;

separating said semiconductive region and said electrically conductive region of said single-crystal silicon layer by forming a clearance at or in the vicinity of the interface therebetween;

forming an insulating portion inside said clearance;

forming a CV conversion circuit in said semiconductive region;

electrically connecting an input terminal of said CV conversion circuit to said electrically conductive region via a lead line; and forming a sensing unit in said electrically conductive region, said sensing unit being electrically connected to said lead line.

2. A manufacturing method or an electrostatic capacitive sensor, comprising the steps of:

forming an electrically conductive region in part of a semiconductor single-crystal silicon layer which forms a silicon-on-insulator substrate;

decreasing the thickness of a semiconductive region of said single-crystal silicon layer and the thickness of part of said electrically conductive region located adjacent to said semiconductive region;

forming an insulating portion by diffusing oxygen into the interface or its adjacent area between said semiconductive region and said electrically conductive region;

forming a CV conversion circuit in said semiconductive region;

electrically connecting an input terminal of said CV conversion circuit to said electrically conductive region via a lead line; and forming a sensing unit in said electrically conductive region, said sensing unit being electrically connected to said lead line.

\* \* \* \* \*